(12) United States Patent
Rees (10) Patent No.: US 10,694,091 B2
(45) Date of Patent: Jun. 23, 2020

(54) IMAGING DEVICE WITH WHITE BALANCE COMPENSATION AND RELATED SYSTEMS AND METHODS

(71) Applicant: UNIVERSITY OF SOUTHERN QUEENSLAND, Toowoomba, Queensland (AU)

(72) Inventor: Steven Rees, Top Camp (AU)

(73) Assignee: UNIVERSITY OF SOUTHERN QUEENSLAND, Toowoomba, Queensland (AU)

(*) Notice: Subject to any disclaimer, the term of this patent is extended or adjusted under 35 U.S.C. 154(b) by 0 days.

(21) Appl. No.: 16/076,238

(22) PCT Filed: Feb. 9, 2017

(86) PCT No.: PCT/IB2017/050719
§ 371 (c)(1),
(2) Date: Aug. 7, 2018

(87) PCT Pub. No.: WO2017/137925
PCT Pub. Date: Aug. 17, 2017

(65) Prior Publication Data
US 2019/0253592 A1    Aug. 15, 2019

Related U.S. Application Data

(60) Provisional application No. 62/293,144, filed on Feb. 9, 2016.

(51) Int. Cl.
*H04N 5/225* (2006.01)
*H04N 5/235* (2006.01)
(Continued)

(52) U.S. Cl.
CPC ......... *H04N 5/2258* (2013.01); *H04N 1/6086* (2013.01); *H04N 5/2256* (2013.01);
(Continued)

(58) Field of Classification Search
CPC .... H04N 5/2258; H04N 5/2354; H04N 9/735; H04N 1/6086; H04N 5/2353; H04N 5/2256
See application file for complete search history.

(56) References Cited

U.S. PATENT DOCUMENTS 6,094,539 A * 7/2000 Abe .................. H04N 1/00249
                                                  348/E9.052
6,545,710 B1   4/2003 Kubo et al.
(Continued)

FOREIGN PATENT DOCUMENTS

CN       104618645 A     5/2015

OTHER PUBLICATIONS

Extended European Search Report issued in corresponding European Application No. 17749953.0 dated Aug. 22, 2019.

*Primary Examiner* — Padma Haliyur
(74) *Attorney, Agent, or Firm* — Birch, Stewart, Kolasch & Birch, LLP (57) ABSTRACT

The various embodiments herein relate to imaging devices and systems that capture an image of a target object and separately capture light from the light source illuminating the target object to compensate for inconsistent lighting of that object. Some systems have scene cameras to capture the images of the target objects and a separate light capturing camera to capture the light from the light source. Other embodiments relate to a single camera capturing an image of the target object while simultaneously capturing light from the light source.

20 Claims, 3 Drawing Sheets

(51) Int. Cl.
*H04N 1/60* (2006.01)
*H04N 9/73* (2006.01)
*H04N 9/04* (2006.01)
*G03B 7/099* (2014.01)

(52) U.S. Cl.
CPC ......... *H04N 5/2353* (2013.01); *H04N 5/2354* (2013.01); *H04N 9/045* (2013.01); *H04N 9/735* (2013.01); *G03B 7/09908* (2013.01); *G03B 2215/0567* (2013.01)

(56) References Cited

U.S. PATENT DOCUMENTS

| | | | |
|---|---|---|---|
| 8,120,696 B2* | 2/2012 | Jerdev | G03B 13/36 348/223.1 |
| 2004/0066463 A1 | 4/2004 | Butterworth | |
| 2009/0002545 A1* | 1/2009 | Heinonen | H04N 5/2253 348/370 |
| 2009/0295947 A1 | 12/2009 | Komiya et al. | |
| 2012/0154627 A1* | 6/2012 | Rivard | G03B 15/02 348/224.1 |
| 2012/0194712 A1 | 8/2012 | Crook et al. | |
| 2014/0240534 A1 | 8/2014 | Kim et al. | |

\* cited by examiner

IMAGING DEVICE WITH WHITE BALANCE COMPENSATION AND RELATED SYSTEMS AND METHODS

CROSS REFERENCE TO RELATED APPLICATIONS

This application is the National Phase of PCT International Application No. PCT/IB2017/050719, filed on Feb. 9, 2017, which claims priority under 35 U.S.C. 119(e) to U.S. Provisional Application No. 62/293,144, filed on Feb. 9, 2016, all of which are hereby expressly incorporated by reference into the present application.

FIELD OF THE INVENTION

The various embodiments herein relate to imaging devices that can compensate for inconsistent lighting, including imaging devices that are used in machine vision systems such as real-time object identification vision systems.

BACKGROUND OF THE INVENTION

One major issue that arises during use of imaging devices in real world environments (outdoors, for example) is inconsistent lighting. Generally, inconsistent lighting can result in images of poor quality. In the context of machine vision systems, inconsistent lighting can create errors in machine vision outputs.

The inconsistent lighting is caused by changes in the light intensity, white balance and shadows. Color temperature is measured in degrees Kelvin (K), and the color temperature of an outdoor light source can vary significantly depending on cloud cover and time of day. For example, color temperature can vary from about 2000 K (reddish) in the morning to about 8000 K (bluish) in the shade. The temperature of white daylight is about 5600 K.

Certain known cameras have been engineered to attempt to compensate automatically for the changes in the source light color. However, the automatic systems and methods to date supply only an approximate compensation and errors in the output of imaging systems, including machine vision systems, still occur.

For example, most consumer video systems such as video cameras and security style cameras use a white balance algorithm to determine the color of the source light. This requires assumptions about what the camera is viewing. For example, an algorithm may be configured to assume that the operator is viewing one third sky and two thirds ground or buildings. The algorithm then determines the light source color as a mix with different weightings based on the amounts of red and blue in the different areas of the image. One issue with this system is that broad assumptions are prone to error and in the case of a machine vision system, every application may be different.

Professional video users and photographers use white cards to correct the white balance. This requires the operator to fill a portion of the view finder with the white card. The algorithm then recognizes that this area in the image should be white and can adjust the red and blue gains to achieve this. However, this method is not suitable for outdoor or machine vision use, because it is only applicable until the light source varies.

Another method that can be used by photographers is to use a white lens cover, set the camera to a manual white balance setting, and take a photo while pointing the camera at the sky. All subsequent photos are taken and stored in raw pixel data format. When the images are downloaded, they are then post-processed to compensate for the light source color. This method is not viable in a real-time machine vision system.

There is a need in the art for an improved imaging device and system that can automatically compensate for inconsistent lighting.

BRIEF SUMMARY OF THE INVENTION

Discussed herein are various imaging devices and systems that compensate for inconsistent lighting.

In Example 1, a imaging system comprises at least one first camera positioned to capture an image of a target object, wherein the target object is illuminated by a light source, a second camera positioned to capture light from the light source, and a communication line operably coupled at a first end to the first processor and at a second end to the second processor. The at least one first camera comprises a first image sensor and a first processor operably coupled to the first image sensor. The second camera comprises a second image sensor and a second processor operably coupled to the second image sensor, wherein the second processor is configured to determine color of the light source.

Example 2 relates to the imaging system according to Example 1, wherein the second processor is further configured to determine color correction gains for an image captured by the at least one first camera based on the color of the light source.

Example 3 relates to the imaging system according to Example 2, wherein the first processor is configured to implement adjustments in the image captured by the at least one first camera based on the color correction gains determined by the second processor.

Example 4 relates to the imaging system according to Example 2, wherein the second processor is configured to determine whether the color correction gains are applied to the image captured by the at least one first camera.

Example 5 relates to the imaging system according to Example 2, wherein the second processor is further configured to limit the color correction gains applied to the image captured by the at least one first camera.

Example 6 relates to the imaging system according to Example 1, wherein the at least one first camera is identical to the second camera.

Example 7 relates to the imaging system according to Example 1, wherein the second processor is further configured to determine intensity of the light source and to determine color correction gains for an image captured by the at least one first camera based on the color and intensity of the light source.

Example 8 relates to the imaging system according to Example 7, wherein the second processor is further configured to determine the intensity of the light source by determining an exposure time of the second camera.

In Example 9, a real-time object identification system comprises at least one scene camera positioned to capture an image of a target object, wherein the target object is illuminated by a light source, a light monitoring camera positioned to capture light from the light source, and a communication line operably coupled at a first end to the scene camera processor and at a second end to the light monitoring processor. The at least one scene camera comprises a scene image sensor and a scene camera processor operably coupled to the scene image sensor. The light monitoring camera comprises a light monitoring image sensor, and a light monitoring processor operably coupled to the light monitoring image sensor, wherein the light monitoring processor is configured to determine color of the light source.

Example 10 relates to the real-time object identification system according to Example 9, wherein the at least one scene camera further comprises a scene camera body, a scene camera lens operably coupled to the scene camera body, and a scene camera lens cover operably coupled to the scene camera body. The scene image sensor is disposed in the scene camera body, the scene camera lens is disposed adjacent to and in light communication with the scene image sensor, and the scene camera is disposed within the scene camera lens cover.

Example 11 relates to the real-time object identification system according to Example 9, wherein the light monitoring camera further comprises a light monitoring camera body, a light monitoring camera lens operably coupled to the light monitoring camera body, and a light monitoring camera lens cover operably coupled to the light monitoring camera body. The light monitoring image sensor is disposed in the light monitoring camera body, the light monitoring camera lens is disposed adjacent to and in light communication with the light monitoring image sensor, and the light monitoring camera lens is disposed within the scene camera lens cover.

Example 12 relates to the real-time object identification system according to Example 11, wherein the light monitoring camera lens cover is 18 percent gray.

Example 13 relates to the real-time object identification system according to Example 11, wherein the light source is a moving light source, wherein the light monitoring camera lens is curved, whereby the light monitoring camera lens is configured to capture light from the moving light source without requiring redirection of the light monitoring camera toward the moving light source.

Example 14 relates to the real-time object identification system according to Example 11, wherein the light source comprises the sun, and wherein the light monitoring camera lens is curved, whereby the light monitoring camera lens is configured to capture light from the sun without requiring redirection of the light monitoring camera toward the sun.

Example 15 relates to the real-time object identification system according to Example 9, wherein the light monitoring processor is further configured to determine color correction gains for the image of the target object captured by the at least one first camera based on the color of the light source, and determine whether the color correction gains are applied to the image of the target object captured by the at least one first camera.

Example 16 relates to the real-time object identification system according to Example 15, wherein the second processor is configured to implement adjustments in the image of the target object captured by the at least one first camera based on the color correction gains.

Example 17 relates to the real-time object identification system according to Example 9, wherein the light monitoring processor is further configured to determine intensity of the light source and to determine color correction gains for the image of the target object captured by the at least one scene camera based on the color and intensity of the light source.

In Example 18, a method of compensating for inconsistent lighting in an imaging system comprises capturing an image of a target object with a first image sensor, wherein the target object is illuminated by a light source, capturing light directly from the light source on a second image sensor, and determining color of the light source based on the light captured directly from the light source on the second image sensor.

Example 19 relates to the method of compensating for inconsistent lighting in an imaging system according to Example 18, further comprising determining color correction gains for the image of the target object captured by the first image sensor based on the color of the light source.

Example 20 relates to the method of compensating for inconsistent lighting in an imaging system according to Example 19, further comprising determining whether the color correction gains are applied to the image of the target object captured by the first image sensor.

Example 21 relates to the method of compensating for inconsistent lighting in an imaging system according to Example 19, further comprising implementing adjustments in the image of the target object captured by the first image sensor based on the color correction gains.

Example 22 relates to the method of compensating for inconsistent lighting in an imaging system according to Example 18, further comprising determining intensity of the light source based on the light captured directly from the light source on the second image sensor, and determining color correction gains for the image of the target object captured by the first image sensor based on the color and the intensity of the light source.

In Example 23, an imaging device comprises a body, a lens associated with the body, an image sensor in communication with the lens, a processor operably coupled to the image sensor, and a light guide associated with the body. The light guide comprises a light receiving portal, and a guide lumen in communication with the portal, wherein the guide lumen is configured to direct the light received within the guide lumen to a specific area of the lens.

Example 24 relates to the imaging device according to Example 23, wherein the light guide further comprises a reflective object configured to direct the light to the lens.

Example 25 relates to the imaging device according to Example 24, wherein the reflective object comprises a mirror.

Example 26 relates to the imaging device according to Example 23, wherein the processor is configured to adjust a white balance based on the light directed to the specific area of the lens.

In Example 27, an imaging device comprises a body, a lens associated with a distal portion of the body, an image sensor positioned in the body, a light guide associated with the body, and a processor configured to adjust a white balance based on the light directed to the specific area of the lens. The image sensor is positioned in relation to the lens such that images captured by the lens are received by the image sensor, the image sensor comprising a white balance sensing area. The light guide comprises a light receiving portal associated with a proximal portion of the body, a guide lumen extending from the portal toward the distal portion of the body, and a mirror disposed within the guide lumen, wherein the mirror is positioned to direct the light received within the guide lumen to the lens.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments disclosed and contemplated herein relate to imaging devices and related systems and methods that automatically compensate for inconsistent lighting. Certain embodiments relate to machine vision systems having an imaging device with inconsistent lighting compensation.

Figure 1:
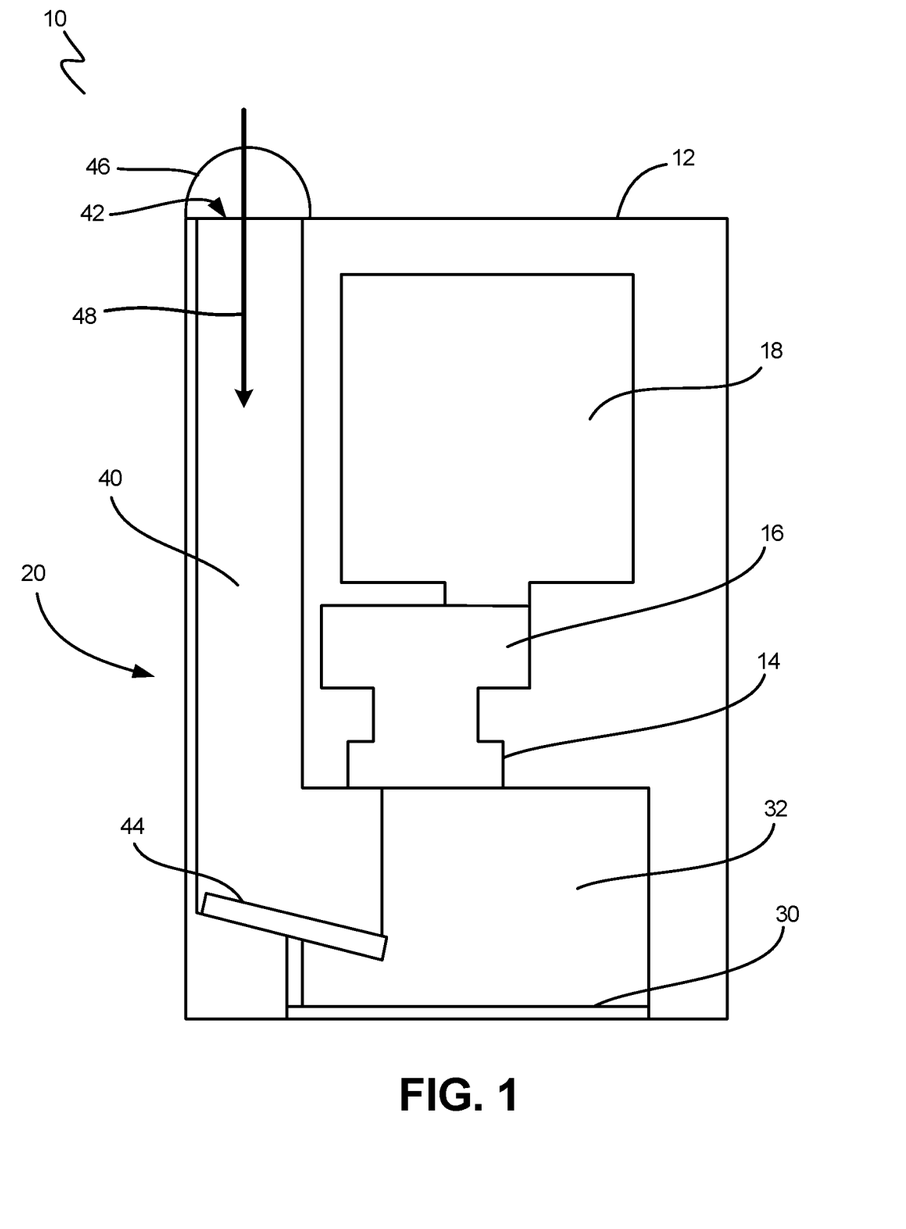
FIG. 1 is a schematic, cross-sectional view of an imaging device with inconsistent light compensation, according to one embodiment.

FIG. 1 depicts one embodiment of an imaging device 10 that automatically compensates for inconsistent lighting. The device 10 includes a body 12, a lens 14, an image sensor 16 configured to receive the image from the lens 14, a processor and memory 18 operably coupled to the image sensor 16, and a light guide 20. In addition, in certain embodiments, the device 10 also includes a viewing lens 30 and cavity 32.

It is understood that the processor and memory 18 can include more than one processor, more than one memory component, and other known electronic components necessary or desirable for a digital imaging device. In various examples, the processor can be a micro controller, a digital signal processor, a logic device such as a field programmable gate array, an application-specific integrated circuit, or other similar, known devices. In one embodiment, the memory is random access memory ("RAM"). Alternatively, the memory can be any known memory for use with the processor device as described. In a further alternative, depending upon the processor, memory may not be required if the processor is configured to process "in-line" (as the data is presented to the processor).

Further, it is also understood that the image sensor 16 as depicted in FIG. 1 can also encompass the enclosure containing the image sensor 16 and any related components that could be positioned within that enclosure. For example, the related components can be light sensors, thermal sensors or any other sensor to provide information from the scene that the image sensor 16 does not collect or supply. In certain embodiment, a further component that can be included is an image analysis circuit if the image sensor 16 is not a system on chip ("SoC") device which has all necessary circuitry on a single chip. The image analysis circuit converts the raw pixel values into meaningful images in specific color schemes such as RGB or YUV.

Figure 2:
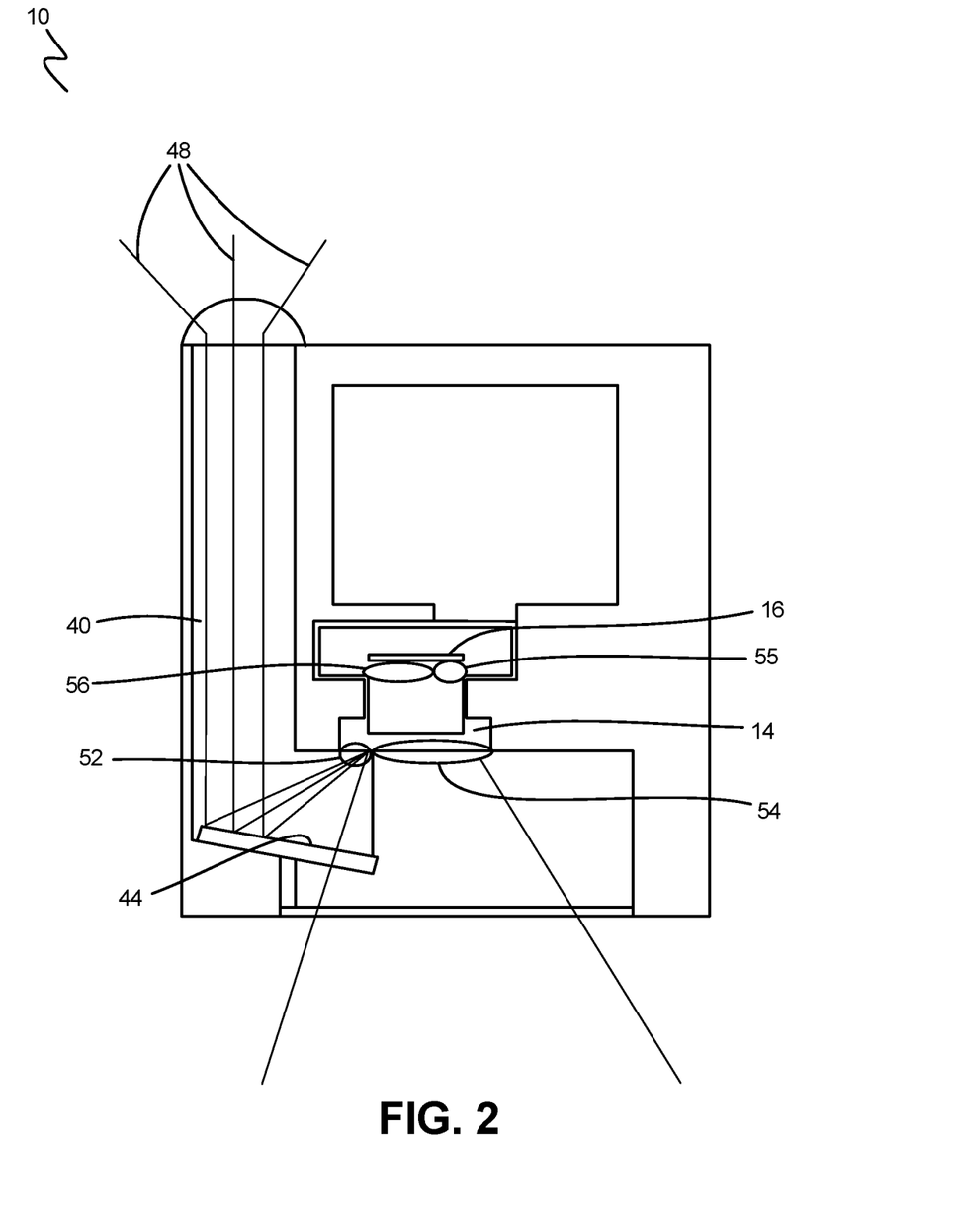
FIG. 2 is another schematic, cross-sectional view of the imaging device of FIG. 1.

The light guide 20 has a light guide lumen 40 with a light receiving opening 42 (also referred to as a "portal") and a reflective object 44. In certain embodiments, the opening 42 has a light concentrator 46 positioned thereon that is made of a known white filter material. As best shown in FIG. 2, the reflective object 44 is positioned such that light 48 that is received through the opening 42 and directed or guided through the lumen 40 is directed by the reflective object 44 to the lens 14. In one embodiment, an algorithm is incorporated into the processor 18 (or elsewhere in the electronics) that is configured to factor in the light concentrator 46 in its calculation of an adjustment of the white balance as described below. For example, the algorithm could alter the red and blue channel gains of the image so the white balance area of the image matches the known filter color concentrator 46 (white would be common). The concentrator 46 redirects the light passing through it into the light guide lumen 40.

It is understood that the reflective object 44 in certain implementations is a mirror 44. Alternatively, the reflective object 44 can be any object or device that can reflect or otherwise direct the light to the lens 14 as described herein.

In one embodiment, the image sensor 16 has at least two regions of interest ("ROI"), as best shown in FIG. 2. ROI 55 is an area or region that is not used for image data but is used to determine the white balance (the "white balance sensing area," also referred to as a "region of interest" or "ROI") 55. This area 55 is positioned on the image sensor 16 as shown in the figure. Alternatively, this area 55 can be anywhere on the image sensor 16 and is configured to receive light that is directed through the light guide lumen 20 and a specific area (the ROI 52) of the lens 14, as described in further detail below. The other ROI 56 is the area or region that is used for image data 56.

As a result, the lens 14 also has two ROIs. As best shown in FIG. 2, the white balance ROI 52 on the lens 14 is an area that does not receive light relating to the image being captured but instead receives light used to determine white balance. The light directed through the light guide 20 is directed to the white balance ROI 52 on the lens 14 and then is directed through the lens 14 to the white balance ROI 55 on the image sensor 16, as discussed above. The second ROI on the lens 14 is the image ROI 54, which receives light relating to the image being captured. The light that passes through the image ROI 54 on the lens 14 is directed to the image ROI 56 on the image sensor 16, as discussed above.

In one specific example, the image sensor 16 is a 640 (w)×480 (h) pixels RGB, and the image data region of interest 56 is horizontal lines between 100 (h) and 400 (h) while the white balance ROI 55 is horizontal lines between 1 (h) and 99 (h). Alternatively, the image sensor can be any known image sensor for use in an imaging device. Further, in alternative embodiments, the image data region of interest 56 can be any grouping of horizontal lines large enough to produce an image that represents the scene under investigation and is dependent upon certain variables, including mounting height, angle to the ground, lens angle, and size of the target objects. The white balance ROI 55 can be any grouping of horizontal lines that are not used in the image data ROI 56 and is large enough to provide meaningful information to obtain color information, which will also be dependent upon certain variables, including mounting height, angle to the ground, lens angle and size of the target objects. In certain embodiments, the horizontal lines can also be used to obtain intensity information, which is also dependent on the same or similar variables.

The processor 18 is configured to adjust the white balance of the resulting image based on the light received in the white balance sensing area 55. That is, the processor 18 has an algorithm or software containing an algorithm that is configured to take into account the light received in the white balance sensing area 55 in calculating the white balance of any resulting image or image data generated via the image sensor 16. As such, the imaging device 10 is capable of real-time updating of the white balance on every frame based on light received from the actual light source in real-time.

Figure 3:
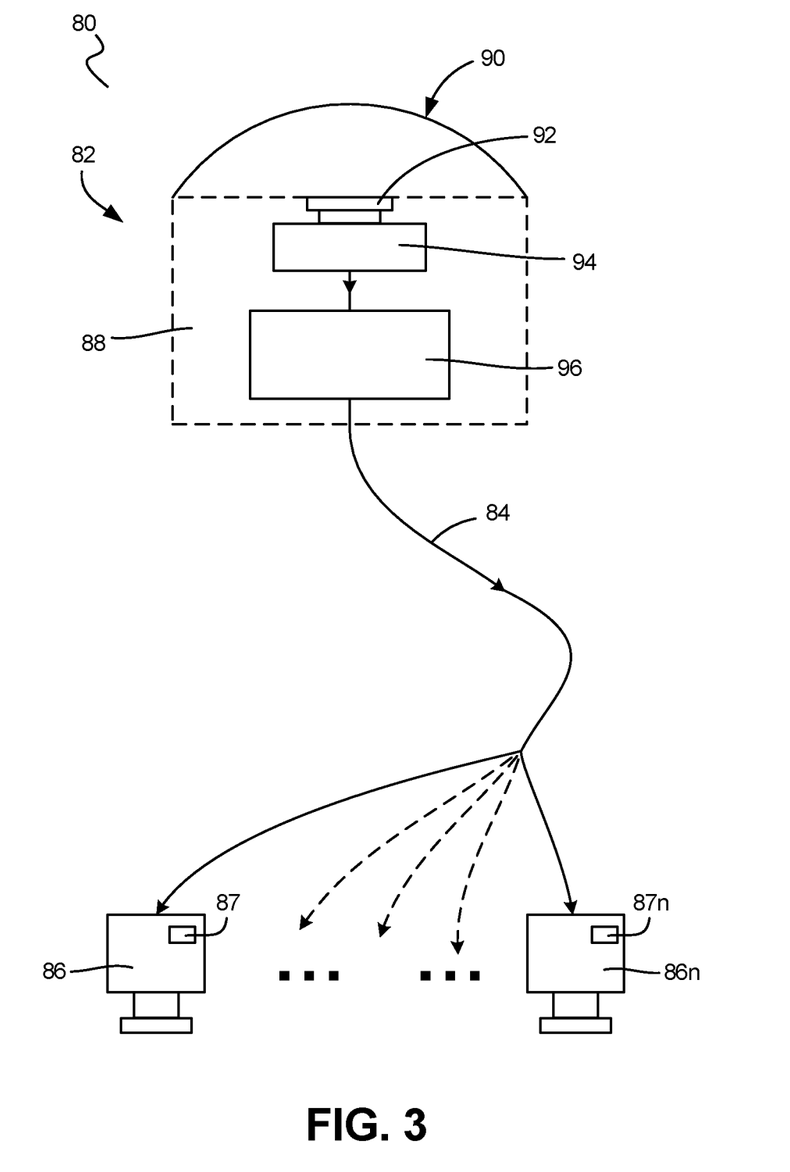
FIG. 3 is a schematic depiction of an imaging system with inconsistent light compensation, according to another embodiment.

Another embodiment of an imaging system 80 that automatically compensates for inconsistent lighting is depicted in FIG. 3, in which the system 80 has a light monitoring camera 82 that is coupled via a communication line 84 to at least one scene camera 86. According to one implementation, the system 80 has one scene camera 86. Alternatively, as shown in FIG. 3, the system 80 has any number of scene cameras 86 ranging from one camera to any number of cameras 86 as shown schematically by scene camera 86n (in which n is equal to any number greater than zero). Each of the scene cameras 86, 86n has a processor 87, 87n that is identical or substantially similar to the microprocessor 96 in the light monitoring camera 82, which is discussed in detail below.

The light monitoring camera 82 has a body 88, a lens cover 90, a lens 92, an image sensor 94, and a microprocessor 96 coupled to the sensor 94. The microprocessor 96 is coupled to the one or more scene cameras 86, 86n via the communication line 84. More specifically, in most embodiments, the microprocessor 96 is coupled to the microprocessors 87, 87n in the one or more scene cameras 86, 86n via the communication 84, thereby resulting in the required communication between the cameras 82, 86, 86n as discussed herein. The lens cover 90, according to one embodiment, is a cover 90 that is made of glass. Further, the cover 90 is a known color that allows light to pass through the cover 90 to reach the lens 92 and thus the sensor 94. For example, in one embodiment, the cover 90 is 18 percent grey. According to an alternative implementation, the cover 90 is white. Alternatively, the cover 90 can be any known material and color that allows light to pass through.

According to one embodiment, the lens 92 is curved to better capture light from the light source without moving the camera 80, even if the light source moves. For example, the curved lens 92 allows for the monitoring camera 80 to be aimed upward such that the longitudinal axis of the camera 80 is substantially perpendicular to the surface (ground or floor) above which the camera 80 is positioned and maintained in that position while still capturing light from the light source, even if the light source moves. As such, in those embodiments in which the sun is the light source, for example, the camera 80 can be aimed upward and still capture light from the sun regardless of the time of day.

In those implementations in which the curved lens 92 allows for capture of light from a moving light source (such as sunlight), a bright spot is created in the image as a result of the light source, and the bright spot moves as the light source moves. In accordance with one implementation, the bright spot is used as the calibration area (the processor 96 determines WG gains from this area) to provide consistency of color and, in some embodiments, intensity. The bright spot can be used for this calibration because the bright spot is closer to the sun's color and is not as attenuated as the indirect light is, especially around the edge of the image where the lens 92 causes distortion. That is, according to one embodiment, the processor 96 can scan the image to identify the center of the bright spot on the image. The processor 96 can then create a patch, which is a set of pixels that are used to highlight the pixels of the image that make up the bright spot.

The light monitoring camera 82 is configured to be positioned such that it is directed toward (or "aimed at") the light source for the scene to be captured by the one or more scene cameras 86, 86n. The camera 82 is used to determine the color, and in some examples, intensity, of the light source, as described in further detail below. As such, the camera 82 typically is positioned above any equipment or other objects—or in any other appropriate position—to prevent such equipment or objects from being positioned between the light source and the camera 82 and thereby casting a shadow upon the camera 82, thereby affecting the capability of the camera 82 to accurately detect the color of the light source and, in some exemplary implementations, the intensity of the light source. Alternatively, it is understood that any such shadows can be taken into account in any embodiments in which the camera 82 cannot be positioned to prevent such shadows.

In addition to the processor 87, 87n, it is understood that each of the one or more scene cameras 86, 86n can have the same components as the light monitoring camera 82 as discussed above, including the body, lens, lens cover, and image sensor.

Further, in accordance with one implementation, the light monitoring camera 82 and the one or more scene cameras 86, 86n are the same type of camera. For example, if commercially-available cameras are used, the light monitoring camera 82 and the one or more scene cameras 86, 86n are the same make and model of camera. In a further, more specific example, the cameras 82, 86, 86n are not only the same make and model, but also have the same white balance settings. In one embodiment, the use of the same type of camera for both the light monitoring camera 82 and the scene camera(s) 86, 86n makes it possible for solely a gain to be determined and applied to the scene camera(s) 86, 86n as described herein. Alternatively, the light monitoring camera 82 is a different type (or make and/or model) of camera in comparison to the scene camera(s) 86, 86n, and the processor 96 uses a correlation factor to correlate the change in the light monitoring camera 82 and the scene camera(s) 86, 86n and ensure they are matched.

In use, the light monitoring camera 82 is used as a pseudo light meter. That is, the light monitoring camera 82 is configured to determine the exposure time (time that the shutter of the camera 82 is allowed to remain open to expose the image sensor 94 to the light; also referred to as "shutter speed") and actuates the shutter to remain open for the appropriate amount of time to allow the appropriate amount of light through the lens 92 and to the image sensor 94. As is understood in the art, the camera shutter is typically an electronic component as in the depicted embodiment of FIG. 3 or, alternatively, can be a mechanical component. The camera processor 96 typically has an algorithm that determines the exposure time based on the brightness of the pixels in the image, with the algorithm being configured to control the shutter to adjust the exposure time to try to ensure the majority of pixels have a value that falls between underexposed and overexposed. This exposure time determination can therefore be used as a pseudo light meter to measure brightness of the light source. For example, if the light source is very bright, the exposure time is short, while if the light source is less bright (such as on a cloudy day when the light source is the sun), the exposure time is longer. Thus, in use, the system 80 utilizes the exposure time of the light monitoring camera 82 to determine the intensity of the light source. The actual exposure time is accessed at each frame or at a consistent rate by the microprocessor 96 and compared to a calibrated range of known exposure times used by the camera at various light intensities such that the actual exposure time can be used to identify the light intensity.

The light intensity information collected about the light source can then be used by system 80 to determine any color correction gains required for the scene image captured by the scene camera 86. More specifically, any color correction gains are determined in the microprocessor 96 by utilizing an area (also known as a "patch," "center patch," or "pixel area") of pixels from the center of the bright spot of the light concentrator 46. For example, in one embodiment, the microprocessor 96 utilizes a 100×100 pixel area centered on the brightest pixel in the image which corresponds to the center of the bright patch on the concentrator 46. Alternatively, the pixel area used can be an area of any size. The microprocessor 96 then determines the average value of red (abbreviated as "AveRed"), green (abbreviated as "AveGreen"), and blue (abbreviated as "AveBlue") colors for the 100×100 pixel area. Next, the microprocessor 96 determines the gains (abbreviated as "WG" herein) needed to raise the average values to white (i.e., 255 on an 8-bit system, for example) using the following formulas: WGRed=255/AveRed, WGGreen=255/AveGreen, and WGBlue=255/AveBlue. These adjustments can then be implemented by the processor 87, 87n in the scene camera 86, 86n in the scene images captured by the scene camera 86, 86n.

In certain implementations, a further optional calculation by the processor 87, 87n in the scene camera 86, 86n can be used to limit the WG gains applied to the scene image so that when the gains are applied to the red, green, and blue pixels, they are not overexposed (i.e., they don't exceed 255). The limit is determined by finding the largest average value and dividing by 255 (i.e., limit=(largest)Ave value/255). Then the final gain (FGain) to apply to each pixel in the scene image is found by multiplying the limit and the WG as follows: FGainRed=WGRed×limit, FGainGreen=WGGreen×limit, FGainBlue=WGBlue×limit. In an alternative embodiment, the processor 96 in the light monitoring camera 82 can perform the calculation and limit the WG gains applied to the scene image.

Once the gains are determined as described above, the microprocessor 96 of the system 80 determines whether the gains need to be applied to the scene image captured by the scene camera 86. First, the exposure time of the scene camera 86 is identified to determine the intensity of light striking the scene that is being captured in the image. In other words, the exposure time is used to determine if the scene is in a bright light condition, a shadow condition, or something in between. For example, if the light source is sunny and the scene image is bright, the processor 96 applies the determined final gains ("Fgains") from the light monitoring camera 82 to the image captured by the image camera 86. In an alternative example, if the light source is sunny and the scene image is shadowed, the microprocessor 96 applies a shadow-modified general set of final gains. This set of final gains can be calibrated or a generic set. In a further alternative example, if the light source is cloudy/shadowed and the scene camera is dull, the microprocessor 96 applies the determined final gains to the image captured by the image camera 86.

It is understood that these adjustments are accomplished using microprocessors. More specifically, as discussed above, each scene camera 86, 86n has a microprocessor 87, 87n and as such, the scene cameras 86, 86n are updated by their own processors 87, 87n. Further, as described above, the gains and brightness information is provided from the processor 96 in the light monitoring camera 82 via the communication line 84 to the processors 87, 87n in the scene cameras 86, 86n. Alternatively, the processors 87, 87n for the scene camera(s) 86, 86n and the processor 96 in the light monitoring camera 82 can be positioned together on the same PCB. In such an embodiment, the communications system may be a bus such as, for example, SPI. If the processors are separated, the communications may be a CAN bus.

It is further understood for purposes of the corrections described above that the light monitoring camera 82 and scene camera(s) 86 can operate with fixed white balance gains and the corrections can then be made to the resultant image. Alternatively, the white balance gains of the scene camera(s) 86 could be varied in place of the image itself without degrading the result.

In addition, it is understood that the white balance compensation can be accomplished with manual white balance settings on the camera as described herein. Alternatively, various embodiments can include automatic white balance compensation set on the cameras with additional calibration to modify the resultant scene image based on the color from the light image. This would require additional calibration as understood by one of skill in the art.

This second embodiment as shown in FIG. 3 determines the color correction required in the image scene by finding the color (and in some cases, the intensity) of the light source as well as the bright and shadowed regions, and the intensity of the image scene.

Although the present invention has been described with reference to preferred embodiments, persons skilled in the art will recognize that changes may be made in form and detail without departing from the spirit and scope of the invention.

What is claimed is:

1. An object identification system comprising:
(a) at least one scene camera positioned to capture an image of a target object, wherein the target object is illuminated by a light source, the at least one scene camera comprising:
(i) a scene image sensor having a scene image sensing direction; and
(ii) a scene processor operably coupled to the scene image sensor;
(b) a light monitoring camera positioned to capture light from the light source wherein the light source is located in a different direction from the scene image sensing direction as the light is received by the object identification system, the light monitoring camera being oriented toward the light source to capture light in a light monitoring sensing direction to capture light from the light source comprising:
(i) a light monitoring image sensor, the light monitoring image sensor collecting light from the light monitoring sensing direction outside the object identification system which is a direction substantially different from the scene image sensing direction; and
(iv) a light monitoring processor operably coupled to the light monitoring image sensor, wherein the light monitoring processor is configured to determine color of the light source and produce color balance information; and
(c) a communication line operably coupled at a first end to the scene processor and at a second end to the light monitoring processor and providing the color balance information from the light monitoring processor to said scene processor;
the scene processor utilizing the color balance information received on said communication line to correct the color of said image produced by said scene image sensor to enhance color accuracy.

2. The object identification system of claim 1 wherein the light monitoring image sensor is positioned to view an area that includes the light source,
the light monitoring processor detecting a bright spot in the image and utilizing the color balance of the bright spot to generate the color balance information.

3. The object identification system of claim 2 wherein the light source may appear in different areas of the image captured by said light monitoring image sensor, 2020-0
the light monitoring processor
scanning the image produced by said light monitoring image sensor to identify the center of the bright spot on the image,
identifying a subset of pixels of said scene image sensor around the center of the bright spot as a calibration area, and
using the calibration area to determine the color balance information.

4. The object identification system of claim 2 wherein the light monitoring camera determines exposure time and produce color correction gains needed to produce a corrected white balance.

5. The object identification system of claim 1, wherein the color balance information generated by said light monitoring processor includes color correction gains generated by said light monitoring processor and supplied over said communication line to said scene processor so that an image captured by the scene camera is corrected for the color of the light source.

6. The object identification system of claim 2, wherein the light monitoring processor is further configured to limit the color correction gains applied to the image captured by the at least one scene camera.

7. The object identification system of claim 1, wherein the scene camera is identical to the light monitoring camera;
wherein the light monitoring camera is oriented to produce a field of view of the area where the light source is to be found.

8. The object identification system of claim 7 wherein plural scene cameras are connected by the communication line to the light monitoring camera.

9. The object identification system of claim 1, wherein the light monitoring processor is further configured to determine intensity of the light source and to determine color correction gains for an image captured by the at least one scene camera based on the color and intensity of the light source.

10. The object identification system of claim 7, wherein the light monitoring processor is further configured to determine the intensity of the light source by determining an exposure time of the light monitoring camera.

11. The object identification system of claim 9, wherein the light monitoring camera further comprises a light monitoring camera lens cover operably coupled to the light monitoring camera body, wherein the light monitoring camera lens is disposed within the scene camera lens cover, wherein the light monitoring camera lens cover is 18 percent gray.

12. The object identification system of claim 11, wherein the light source is a moving light source, wherein the light monitoring camera lens is curved, whereby the light monitoring camera lens is configured to capture light from the moving light source without requiring redirection of the light monitoring camera toward the moving light source.

13. The object identification system of claim 3, wherein the light source comprises the sun, and wherein the light monitoring camera lens is curved, whereby the light monitoring camera lens is configured to capture light from the sun without requiring redirection of the light monitoring camera toward the sun.

14. The object identification system of claim 9, wherein the light monitoring processor is further configured to:
determine color correction gains for the image of the target object captured by the at least one scene camera based on the color of the light source; and
determine whether the color correction gains are applied to the image of the target object captured by the at least one scene camera.

15. A method of compensating for inconsistent lighting in an imaging system, the method comprising:
capturing an image of a target object with a scene image sensor having a scene image sensing direction with respect to the imaging system, wherein the target object is illuminated by a light source;
capturing light directly from the light source on a light monitoring image sensor, the light monitoring image sensor being directed toward the light source with an orientation in a direction substantially different from the scene image sensing direction as collected by the imaging system;
processing the light obtained from the light monitoring image sensor and determining color balance information therefrom;
providing the color balance information from the light monitoring image sensor to a processor processing the image captured by the scene image sensor, and
adjusting the color balance of the image of the target object from the color balance information.

16. The method of claim 15 including positioning the light monitoring image sensor i to view an area that includes the light source,
the light monitoring processor detecting a bright spot in the image and utilizing the color balance of the bright spot to generate the color balance information.

17. The method of claim 16 wherein the light source may appear in different areas of the image captured by said light monitoring image sensor,
the light monitoring processor
scanning the image produced by said light monitoring image sensor to identify the center of the bright spot on the image,
identifying a subset of pixels of said scene image sensor around the center of the bright spot as a calibration area, and
using the calibration area to determine the color balance information.

18. The method of claim 16 wherein the light monitoring camera further determines exposure time and produces color correction gains needed to produce a corrected white balance.

19. The method of claim 15, wherein the scene camera is identical to the light monitoring camera, the method further comprising;
orienting the light monitoring camera to produce a field of view of the area where the light source is to be found.

20. The method of claim 17, wherein the light source comprises the sun, and wherein the light monitoring image sensor is configured to capture light from the sun without requiring redirection of the light monitoring camera toward the sun.

* * * * *